United States Patent [19]
Tuken

[11] Patent Number: 5,609,136
[45] Date of Patent: Mar. 11, 1997

[54] MODEL PREDICTIVE CONTROL FOR HPI CLOSED-LOOP FUEL PRESSURE CONTROL SYSTEM

[75] Inventor: Taner Tuken, Columbus, Ind.

[73] Assignee: Cummins Engine Company, Inc., Columbus, Ind.

[21] Appl. No.: 267,606

[22] Filed: Jun. 28, 1994

[51] Int. Cl.$^6$ ............................ F02M 7/00; F02D 31/00
[52] U.S. Cl. ...................... 123/357; 123/446; 364/164
[58] Field of Search ................................ 123/478, 480, 123/458, 674, 357, 339.2; 364/149, 150, 151, 164, 165

[56] References Cited

U.S. PATENT DOCUMENTS

| | | | |
|---|---|---|---|
| 3,604,907 | 9/1970 | Wesner | 125/150.2 |
| 3,767,900 | 10/1973 | Chao et al. | 364/164 |
| 3,894,396 | 7/1975 | Durrant | 364/165 |
| 4,054,780 | 10/1977 | Bartley et al. | 364/164 |
| 4,164,167 | 8/1979 | Imai et al. | 91/364 |
| 4,277,832 | 7/1981 | Wong | 364/164 |
| 4,319,320 | 3/1982 | Sato et al. | 364/165 |
| 4,419,729 | 12/1983 | Krieder | 364/164 |
| 4,545,009 | 10/1985 | Muraki et al. | 364/165 |
| 4,557,106 | 12/1985 | Williams et al. | |
| 4,582,026 | 4/1986 | Takita et al. | 364/164 |
| 4,641,625 | 2/1987 | Smith | 123/575 |
| 4,699,025 | 10/1987 | Omitsu | |
| 4,732,003 | 3/1988 | Ueno et al. | 60/602 |
| 4,844,035 | 7/1989 | Takagi | 123/357 |
| 4,852,538 | 8/1989 | Nagaishi | 123/480 |
| 4,875,447 | 10/1989 | Kiuchi et al. | 123/339 |
| 4,961,441 | 10/1990 | Salter et al. | 137/14 |
| 4,969,439 | 11/1990 | Scotson | 123/478 |
| 4,971,016 | 11/1990 | Peters et al. | 123/500 |
| 5,085,190 | 2/1992 | Birk et al. | 123/257 |
| 5,091,843 | 2/1992 | Peczkowski | 364/164 |
| 5,094,213 | 3/1992 | Dudek et al. | 123/478 |
| 5,148,369 | 9/1992 | Uchinami et al. | 123/480 |
| 5,158,058 | 10/1992 | Yoshida et al. | 123/698 |
| 5,178,111 | 1/1993 | Wietelmann et al. | 123/357 |
| 5,189,620 | 2/1993 | Parsons et al. | 364/161 |
| 5,191,867 | 3/1993 | Glassey | 123/446 |
| 5,211,712 | 5/1993 | Weitelmann et al. | 123/357 |
| 5,241,933 | 9/1993 | Morikaw | 123/458 |
| 5,268,835 | 12/1993 | Miyagaki et al. | 364/151 |
| 5,270,935 | 12/1993 | Dudek et al. | 123/480 |
| 5,274,559 | 12/1993 | Takahashi et al. | 123/480 |
| 5,303,142 | 4/1994 | Parsons et al. | 364/165 |
| 5,331,852 | 5/1994 | Yoshida et al. | 123/674 |
| 5,347,446 | 9/1994 | Lino et al. | 364/164 |
| 5,357,912 | 10/1994 | Barnes et al. | 123/357 |
| 5,410,470 | 5/1995 | Yamaoka et al. | 364/164 |
| 5,424,942 | 6/1995 | Dong et al. | 364/164 |

OTHER PUBLICATIONS

Katsuhiko Ogata, Modern Control Engineering, Prentice–Hall, Inc. 1970.

*Primary Examiner*—Thomas N. Moulis
*Attorney, Agent, or Firm*—Woodard, Emhardt, Naughton Moriarty & McNett

[57] ABSTRACT

A closed-loop control system having two feedback paths 106, 108. A first feedback path contains an expected system output value generated by a system model 102. The second feedback path provides insensitivity to noise by heavily filtering the error between the model output 104 and the actual measured system output 74. Because of the delay associated with the filtering operation, the dual feedback paths result in an initial fast (but approximated) system response, followed by a delayed correction to that response.

23 Claims, 18 Drawing Sheets

Fig. 3 *(Prior Art)*

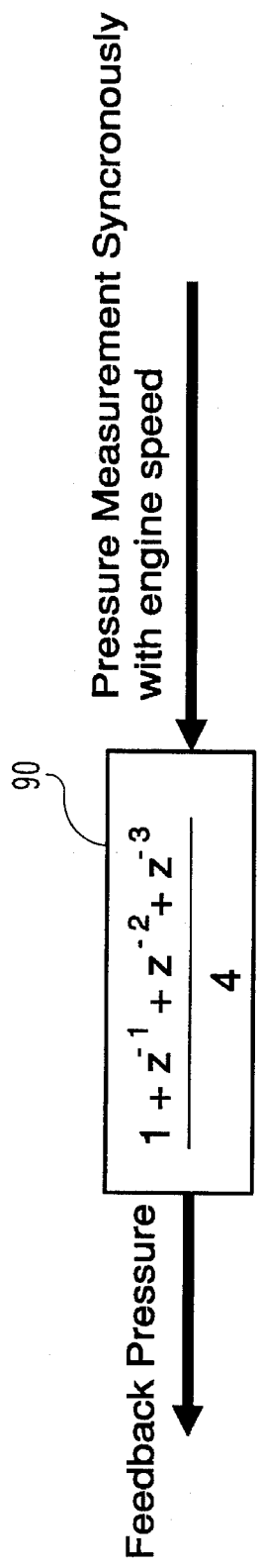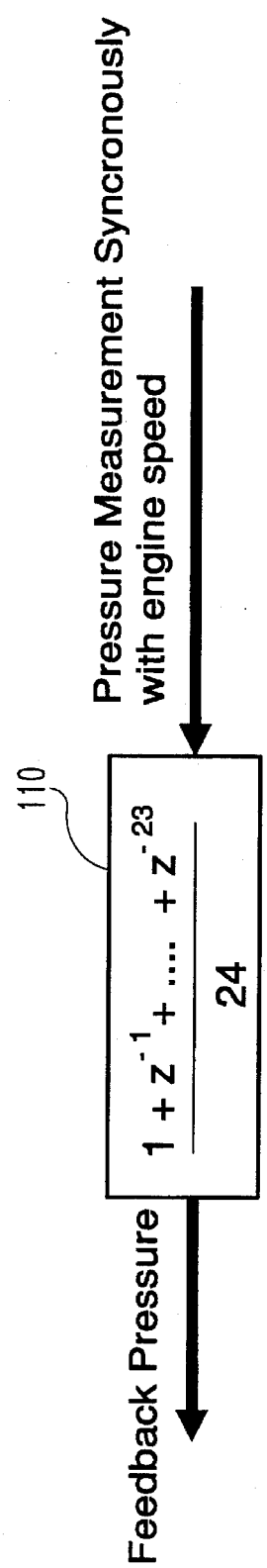
Fig. 8 *(Prior Art)*
Fig. 9

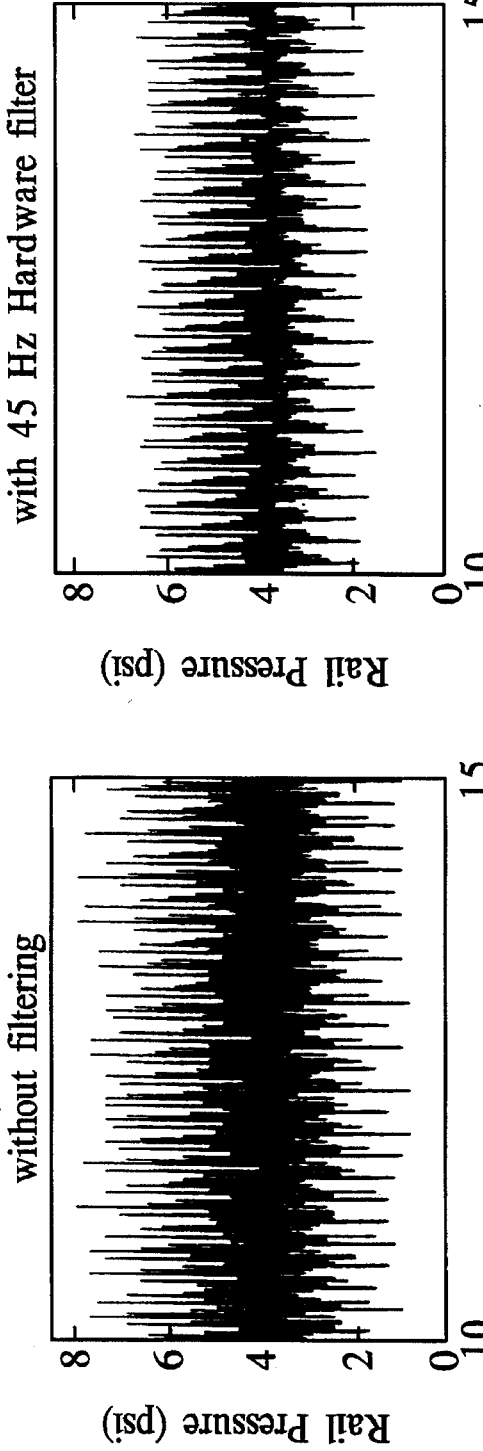
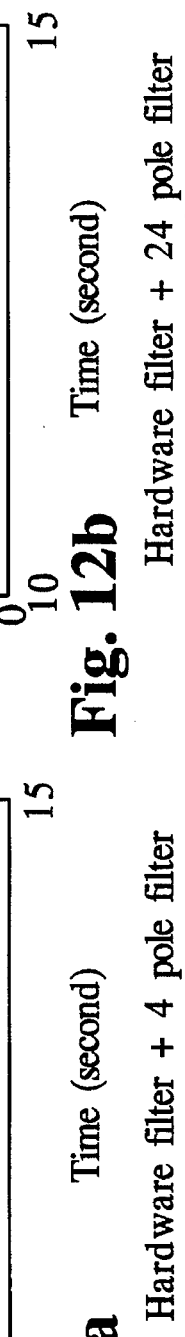
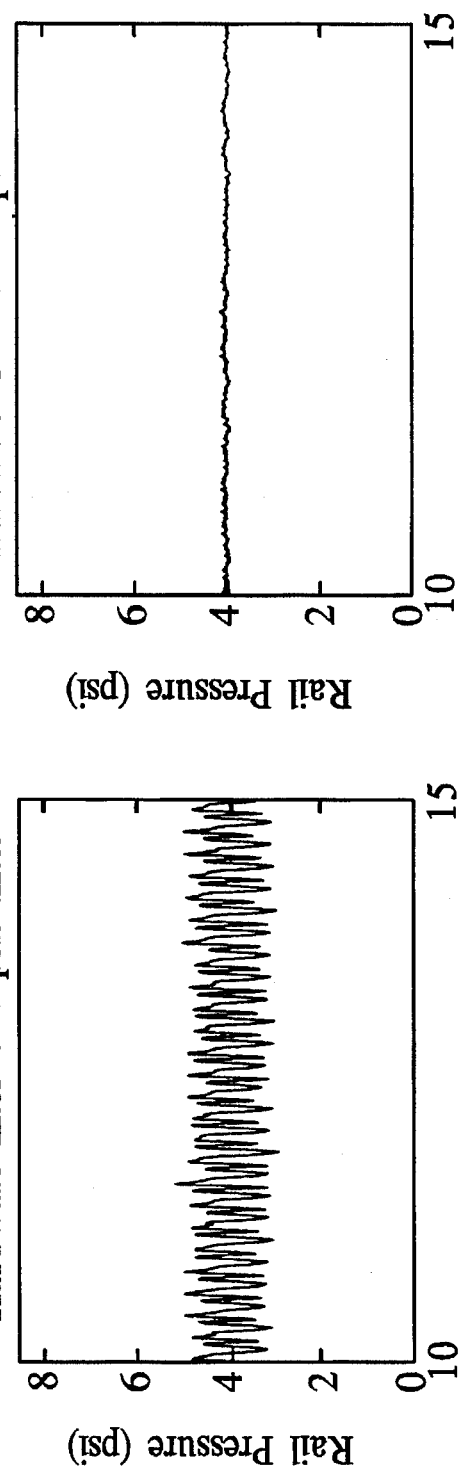
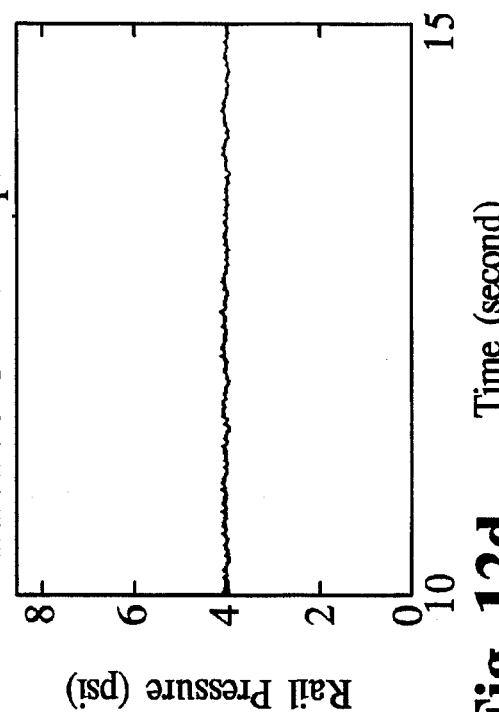
Fig. 12a  without filtering
Fig. 12b  with 45 Hz Hardware filter
Fig. 12c  Hardware filter + 4 pole filter
Fig. 12d  Hardware filter + 24 pole filter

MODEL PREDICTIVE CONTROL FOR HPI CLOSED-LOOP FUEL PRESSURE CONTROL SYSTEM

BACKGROUND OF THE INVENTION

1. Technical Field of the Invention

The present invention relates generally to fuel supply systems for supplying fuel to the fuel injectors on an internal combustion engine and more particularly to a model predictive control closed-loop controller for an electronically controlled fuel supply system.

2. Background of the Invention

In the quest for high efficiency emissions-free internal combustion engines, engine manufacturers have attempted to develop engine fuel supply systems that achieve complete fuel combustion. One such system is the high pressure ignition (HPI) fuel system. Such systems require each fuel injector to achieve SAC pressures in excess of 30,000 psi during the injection cycle. In order to make such injection pressures possible, precise supply and control of both fuel and timing fluid to each engine fuel injector is required. In an HPI fuel system, the two most important system variables which need to be precisely controlled are the rail (injector fuel supply) and timing pressures.

Several HPI fuel supply systems are disclosed in U.S. Pat. No. 4,971,016 issued to Peters et al., which is assigned to the assignee of the present application and is incorporated herein in its entirety by reference. One such HPI fuel supply system is illustrated in FIG. 1 and indicated generally at 10. Fuel supply system 10 is a basic closed-loop electronically controlled injector fuel supply system. A gear pump 12 pumps fuel from a reservoir 14 into a fuel supply channel 16. A pressure regulator 18 regulates the pressure of the fuel in supply channel 16 as required before supply channel 16 bifurcates to form a fueling channel 20 and a timing fluid channel 22. A pulse width modulated solenoid pilot valve 24 is positioned on one side of a servo valve 26 in section 28 of the fueling channel 20, and a similar pulse width modulated solenoid pilot valve 30 is positioned on one side of a servo valve 32 in section 34 of the timing channel 22. Each of the solenoid valves is also connected to a drain line which ultimately provides a fluid connection between the valve and fluid reservoir 14. Drain line 36 allows fluid to flow from solenoid valve 24 to reservoir 14, and drain line 38 allows fluid to flow from solenoid valve 30 to reservoir 14. The fuel in reservoir lines 36 and 38 will have a lower pressure than the fuel in lines 28 and 34. Restricted orifices 40 and 42 are positioned in channel sections 28 and 34, respectively, to assist in maintaining the appropriate pressure levels in these lines by restricting the flow of fuel past each of the servo valves. A pressure transducer 44 downstream of the servo valve 26 measures the pressure of the fuel in fuel channel 46, while a similar pressure transducer 48 measures the pressure of the timing fluid/fuel in channel 50. These pressure measurements are transmitted to an electronic control unit 52 (ECU). This electronic control unit, in its most basic form, requires only an engine throttle position signal 54 and an engine speed (RPM) signal 56 as input to control the pressure of the fuel in the channels 46 and 50. A lookup table (not shown) is included in ECU 52. The desired fuel and timing fluid pressures for specific engine throttle positions and engine speeds are programmed into the lookup table so that when the ECU 52 receives pressure information from the pressure transducers 44, 48, this pressure information is compared with the desired pressures for the specific engine throttle position and engine RPM and the ECU 52 transmits signals to the solenoid valves 24, 30, to set them accordingly. The position of the solenoid valve 30 will control the amount of timing fluid supplied to the injector and, therefore, the pressure of the timing fluid and the advance of timing. Similarly, the position of the solenoid valve 24 will control the amount of fuel supplied to the injector fuel rail and, therefore, the fuel pressure. Because this system includes a feedback signal indicative of the pressure produced by the control signal, it is referred to as a closed-loop control.

Therefore, information regarding engine operating conditions is used to provide an output signal to each of the valves 24, 30 that will actuate each valve to set an appropriate pilot pressure on one side of each of the servo valves 26 and 32. The servo valve 26 in fueling channel 20 will then regulate the fuel flow until the pressure of the fuel flowing into fueling channel 46 is equal to the pilot pressure. The fuel in channel section 46 is then supplied at this pressure to a plurality of injector fuel passages, shown schematically at 58. The pressure of the fuel to be injected, therefore, is precisely controlled by the servo valve 26 in accordance with the pilot pressure set by the solenoid valve 24. Likewise, the servo valve in timing fluid channel 22 regulates the flow of timing fluid (fuel) into timing fluid channel section 50 so that the pressure of the timing fluid supplied to the injectors, shown schematically at 59, is equal to the pilot pressure set by the solenoid valve 30.

Referring now to FIG. 2, there is indicated generally at 70 a prior art proportional-integral-derivative (PID) control structure, which may be implemented in the ECU 52 of FIG. 1, for example. Due to the noise in the pressure measurements from pressure transducers 44 and 48, the derivative portion of the algorithm is normally turned off. Therefore, the control structure 70 is practically a PI controller. The desired pressure 72 is calculated by the ECU 52 based upon throttle position 54 and engine speed 56. The actual pressure 74, as measured by either the pressure transducer 44 or 48, is also input to the PID algorithm 78 via the feedback path 76. Based upon a comparison of the desired pressure 72 and the fedback actual pressure 74, the PID algorithm 78 determines a commanded pressure 80. The commanded pressure 80 is chosen with the intent of causing the actual pressure 74 to equate with the desired pressure 72. The commanded pressure 80 is applied to a lookup table 82 which determines an appropriate duty cycle 84 to be applied to the respective pilot valve 24 or 30. The block 86 represents the system transfer function such that application of the duty cycle signal 84 to the system produces a pressure in the system as represented by the actual pressure 74. However, the actual pressure 74 as measured by pressure transducers 44 and 48, is subject to a noise component 88 which is associated with the firing frequency (and multiples and sub-multiples of it) plus any other system disturbances (such as gear pump pressure variation effects, timing fluid/injector fuel loop interactions, etc.). In order to counteract this noise component 88, prior art control systems such as the system 70 incorporate a filter 90 in the feedback path 76. The filter 90 is a 4-pole averaging filter, which effectively removes any noise component 88 at the firing frequency and multiples of this frequency, if pressure measurements are synchronized with engine speed measurements. However, the filter 90 cannot remove any sub-multiples of the firing frequency noise components in the pressure measurements.

This inability of the prior art control structures to completely filter the noise component 88 creates serious problems in engine performance when a fast response time is required. For example, it is sometimes desirable to have a response time for a step-input to the fuel and timing pressure loops on the order of 30 to 50 milliseconds. FIG. 3 shows actual fuel rail pressure response obtained from a six-cylinder Cummins L10 engine controlled by the controller 70 of FIG. 2 using the parameters of Kpl=1.1 and KI=0.6. These parameters give a response time to a step input of approximately 50 milliseconds. This test was conducted at 600 RPM with 100–500 ft-lbs. torque changes. Although it is possible to tune the fuel rail pressure loop for fast system response, as demonstrated by the data in FIG. 3, it is not feasible in practice since timing stability is totally lost when the control parameters are selected for fast response. In other words, the faster the system response, the worse the timing stability becomes. There is therefore a need in the prior art for a fuel system control structure which allows for a fast response time as well as providing for timing stability. The present invention is directed towards meeting those needs.

SUMMARY OF THE INVENTION

The present invention relates to an apparatus and method for model predictive control for HPI closed-loop fuel pressure control systems. The use of model predictive control of the fuel delivery system allows for both fast response time and timing stability, parameters which are mutually exclusive in prior art PID controllers. The present invention uses two feedback paths. A first feedback path contains an expected system output value generated by a model of the system. This path provides the desired fast system response. The second feedback path provides insensitivity to measurement noise by heavily filtering the error between the model output (expected value) and the actual system output. Because of the delay associated with the filtering operation, the dual feedback paths result in an initial fast (but approximated) system response, followed by a delayed correction to that response.

In one form of the invention, a method of providing fast response from a first system controlled by a closed-loop control system is disclosed, comprising the steps of inputting a desired first system output signal to the control system, generating a first system input signal from the control system based on the desired first system output signal, generating an expected first system output signal based on the first system input signal, feeding back the expected first system output signal as a first feedback input to the control system, applying the first system input signal to the first system, generating an actual first system output signal from the first system, generating an error input signal equal to a difference between the actual first system output signal and the expected first system output signal, generating an error output signal based on the error input signal, and feeding back the error output signal as a second feedback input to the control system, wherein there is a delay between feedback of the first and second feedback inputs.

In another form of the invention, a fuel pressure system employing model predictive closed-loop control is disclosed, comprising a reservoir adapted to hold a quantity of fuel, a fuel pump operable to supply the fuel to a fuel injection system at a rate, a pressure control device operatively coupled to the fuel injection system and operable to establish a fuel pressure in the fuel injection system, wherein the fuel is delivered to at least one fuel injector at the fuel pressure, a pressure transducer operatively coupled to the fuel injection system and operable to produce a measured fuel pressure signal proportional to the fuel pressure, and a control system operable to receive an input from the pressure transducer and provide a pressure control output to the pressure control device, wherein the control system generates the pressure control output using a model predictive first feedback signal and a second feedback signal based on the measured fuel pressure signal.

In another form of the invention, a method of providing feedback in a closed-loop control system which controls a first system is disclosed, comprising the steps of calculating a first portion of a control algorithm in a feedforward path, predicting an expected output of the first system using a model of the first system, using the expected output to calculate a second portion of the control algorithm, thereby creating a first feedback input, feeding back the first feedback input to the first portion, computing an error between an actual output of the first system and the expected output, creating a second feedback input based on the error, and feeding back the second feedback input to the first portion, wherein both pole and zero locations of the control algorigthm may be assigned arbitrarily.

BRIEF DESCRIPTION OF THE DRAWINGS

The objects and features of the present invention will be readily apparent to those skilled in the art from the following detailed description and appended drawings, illustrating embodiments of the present invention wherein:

FIG. 8 is a schematic representation of a prior art filter structure;

FIG. 9 is a schematic representation of a first embodiment filter structure of the present invention;

FIGS. 12a–d are graphs of rail pressure versus time for the same engine utilizing different prior art control systems, as well as control systems of the present invention;

DETAILED DESCRIPTION OF THE DRAWINGS

Figure 1:
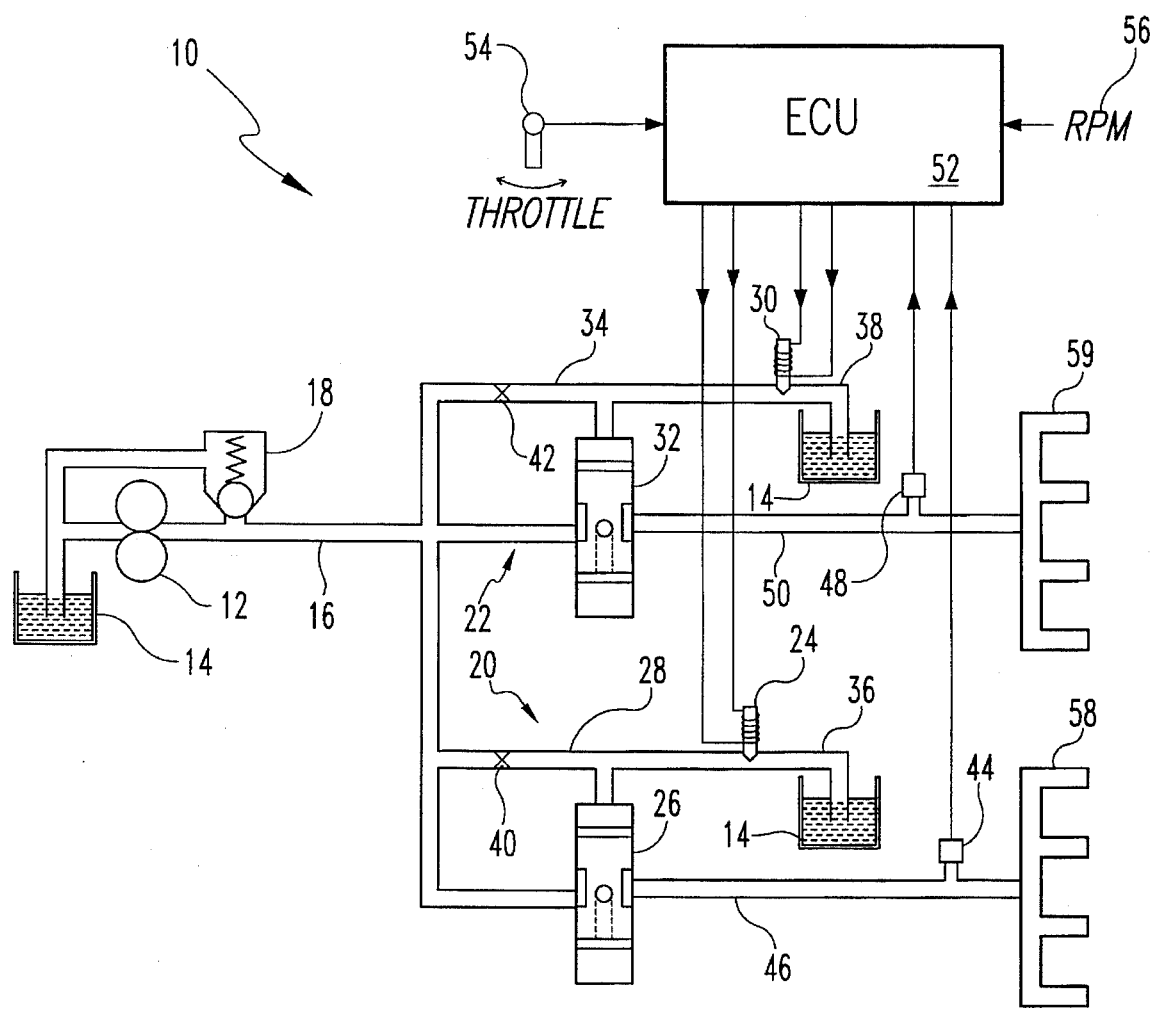
FIG. 1 is a schematic diagram of a prior art timing fluid and fuel supply system with associated control system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in tile illustrated device, and such further applications of the principles of the invention as illustrated therein being contemplated as would normally occur to one skilled in the art to which tile invention relates.

Figure 2:
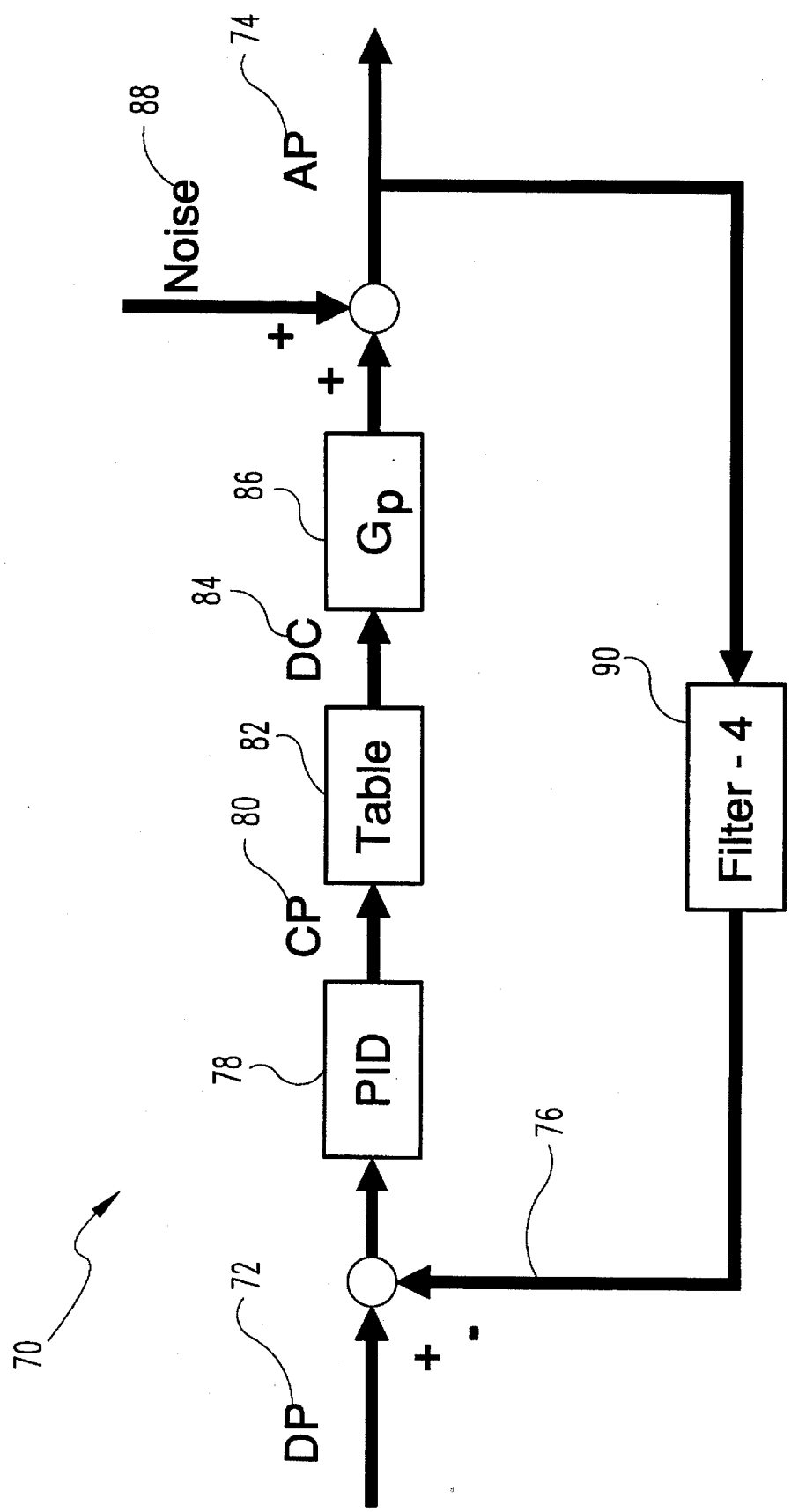
FIG. 2 is a block diagram of a prior art closed-loop PID control system.
Figure 3:
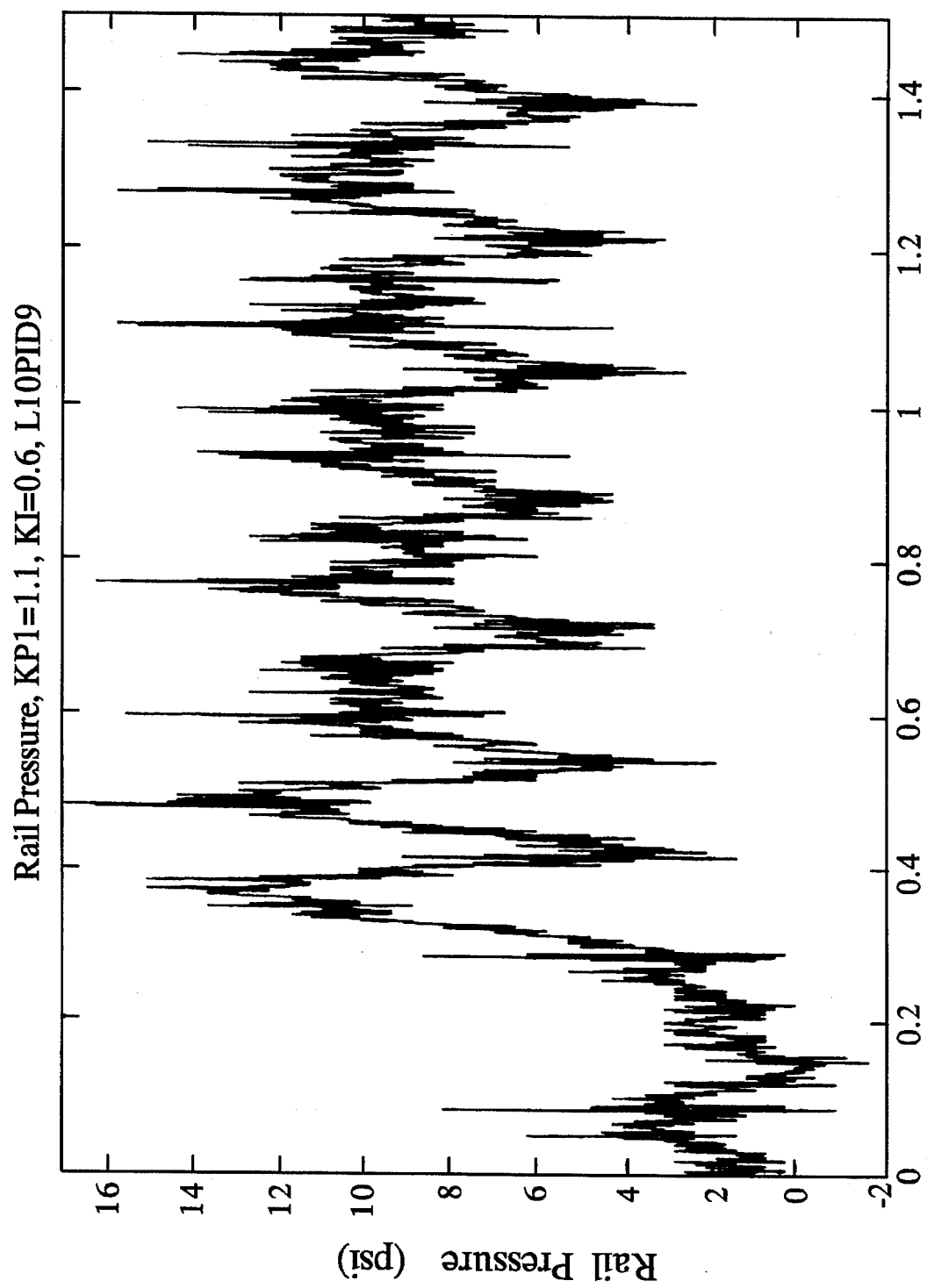
FIG. 3 is a graph of rail pressure versus time for an engine utilizing the prior art control system of FIG. 2.
Figure 4:
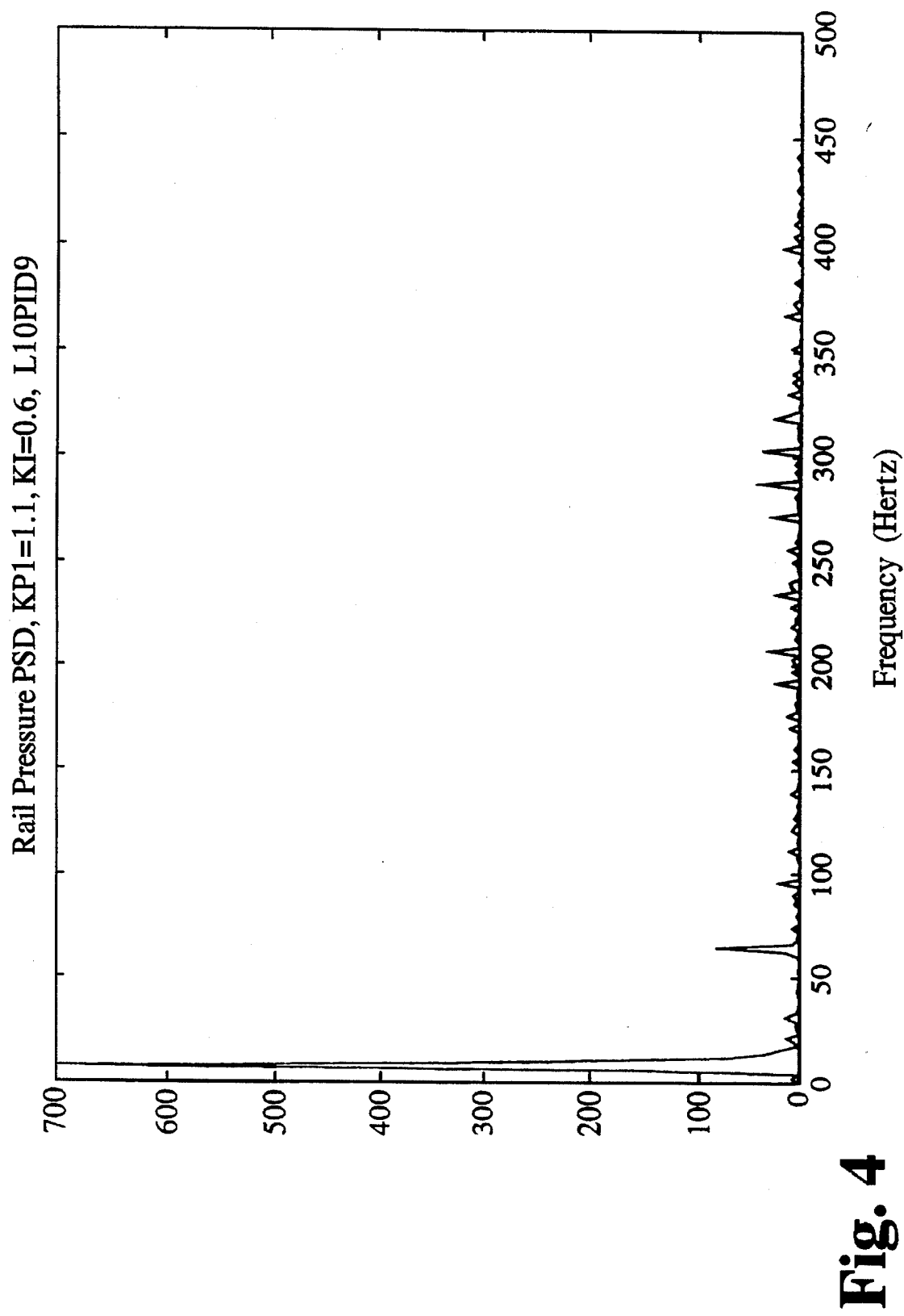
FIG. 4 is a power spectrum density measurement of the data of FIG. 3.
Figure 5:
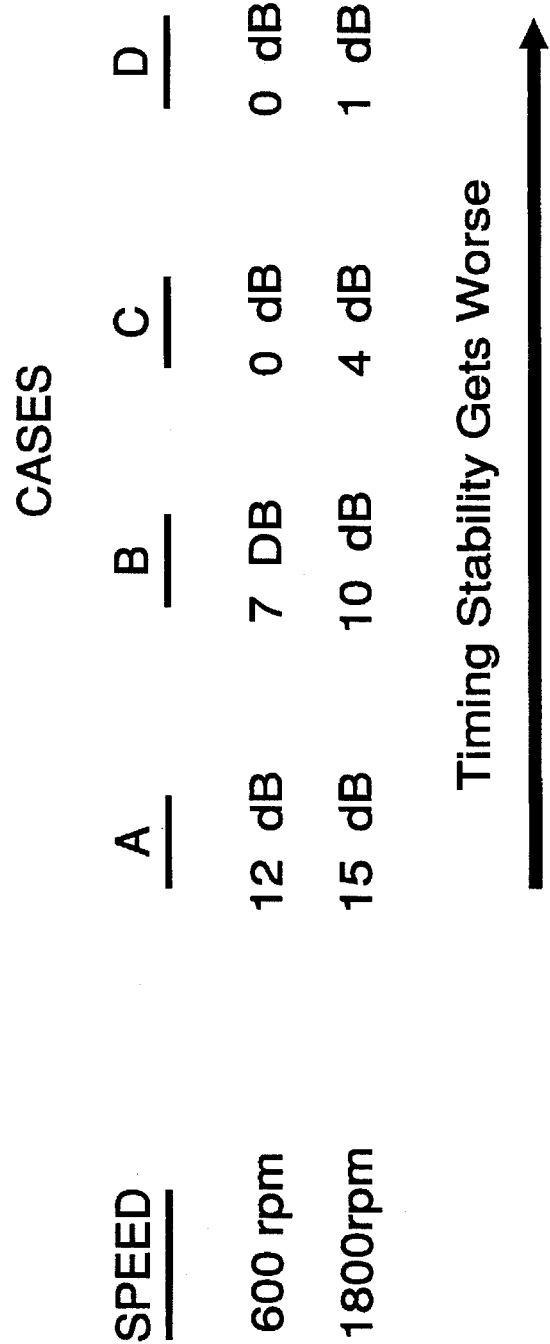
FIG. 5 is tabular data comparing response time, attenuation of the ⅙ firing frequency, and timing stability of an engine utilizing the prior art control system of FIG. 2.

In order to determine what causes instability of the prior art control structure of FIG. 2 when tuned for fast response time, the power spectrum density of the fuel rail pressure measurement of FIG. 3 was determined. This power spectrum density is illustrated graphically in FIG. 4. The data of FIG. 4 shows that a frequency component in the fuel rail pressure signal equal to ⅙ the firing frequency becomes much more dominant when the prior art controller 70 is tuned for a fast response mode. This phenomenon occurs because the frequency response of the control system 70 changes as the parameters are altered for fast response, increasing amplification at ⅙ firing frequency. Because the prior art 4-pole filter 90 is unable to filter sub-multiples of the firing frequency, amplification of this ⅙ firing frequency component by the closed-loop system 70 causes unstable operation when the control system is tuned for fast response. FIG. 5 summarizes tile attenuation of the ⅙ firing frequency components for a PID control algorithm having various response times. In case A, the control system is tuned for a 700 millisecond response time, and the ⅙ firing frequency component is attenuated by 12 dB at 600 RPM. When tuned for a 400 millisecond response time, the attenuation decreases to 7 dB, while the attenuation completely disappears when the control system is tuned for a response time of 55 or 30 milliseconds (cases C and D). Actual operation of the prior art control system of FIG. 2 with a test engine indicates that timing stability gets worse as the attenuation of the ⅙ firing frequency component decreases. A similar result is obtained at 1800 RPM. The ⅙ firing frequency component could be eliminated by using a filter in the feedback loop having more poles, however such a filter would operate too slowly to allow the control system 70 to exhibit the desired fast response. Increased filtering and faster response tuning are therefore mutually exclusive in the prior art control system 70.

Figure 6:
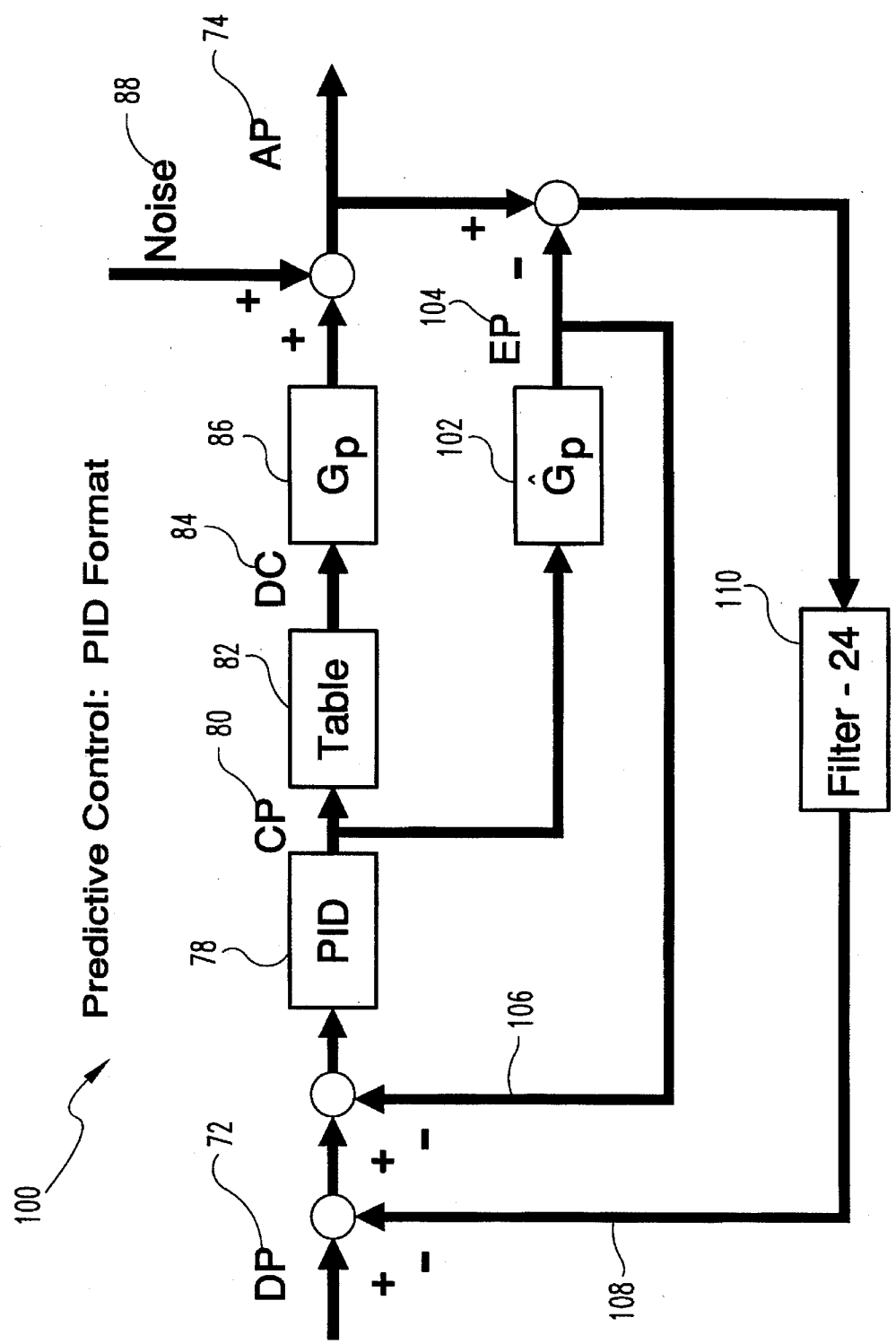
FIG. 6 is a block diagram of a first embodiment control system of the present invention.

Referring now to FIG. 6, there is illustrated a model predictive control closed-loop control system 100 of the present invention, which allows filtration of the ⅙ firing frequency component, and at the same time provides for fast closed-loop system response. As with the prior art closed-loop control system 70 of FIG. 2, the control system 100 uses the desired pressure 72 from the ECU 52 as an input to the PID algorithm 78 in order to calculate a commanded pressure 80. This commanded pressure 80 is input to a lookup table 82 which returns a duty cycle 84 that is applied to the solenoid valves 24 and 30. The system transfer function 86 determines the actual pressure 74 which results in the timing fluid and fuel rails. The inner control loop of FIG. 6 is based on a prediction of the system output through a model. The predicted system transfer function 102 accepts the commanded pressure 80 as an input and produces an expected pressure 104 as an output. The expected pressure 104 is predicted by the model 102 based on the expected response of the fuel system, and is not an actual measured pressure. The expected pressure 104 is fed back directly to the PID controller 78 via feedback path 106. This immediate feedback path allows the control system 100 to exhibit the desired fast response time. Since the model output does not contain any noise which must be filtered, the inner feedback loop 106 can be made to be arbitrarily fast. However, since this results in an open-loop structure, the outer loop 108 is required in order to make the system closed-loop. Because the inner loop 106 provides the fast system response, a relatively slow 24-pole averaging filter 110 may be used in the outer loop 108. The 24-pole filter 110 is capable of filtering sub-multiples of the firing frequency, including the ⅙ firing frequency component. The signal filtered by the filter 110 is the difference between the actual pressure 74 and the expected pressure 104. If the system model 102 matches the actual system transfer function 86 perfectly, then the signal input to the filter 110 contains only noise 88, which is reduced significantly by the 24-pole filter 110. In this case, little or no feedback signal is applied by path 108, nor is any required since the expected pressure 104 accurately predicted the actual pressure 74. If, on the other hand, the model 102 does not predict the actual system response 86 exactly, then the outer feedback loop contains the noise 88 plus any discrepancy between the actual pressure 74 and the expected pressure 104 (the discrepancy between the model output and the actual system output). Once filtered, this discrepancy is fed back in order to correct the actual pressure 74. The result of the dual feedback loops 106 and 108 is that the system will have a very fast initial response to a change in the desired pressure 72, followed by a slower correction to this response through the delayed feedback signal 108. The fast initial response is very close to the desired system response, which is then fine-tuned when the feedback signal 108 from the filter 110 becomes available. By allowing removal of the low frequency noise components in the pressure measurements, the predictive control system 100 of the present invention enables both fast and stable response to changes in timing fluid and injector fuel pressure.

Figure 7:
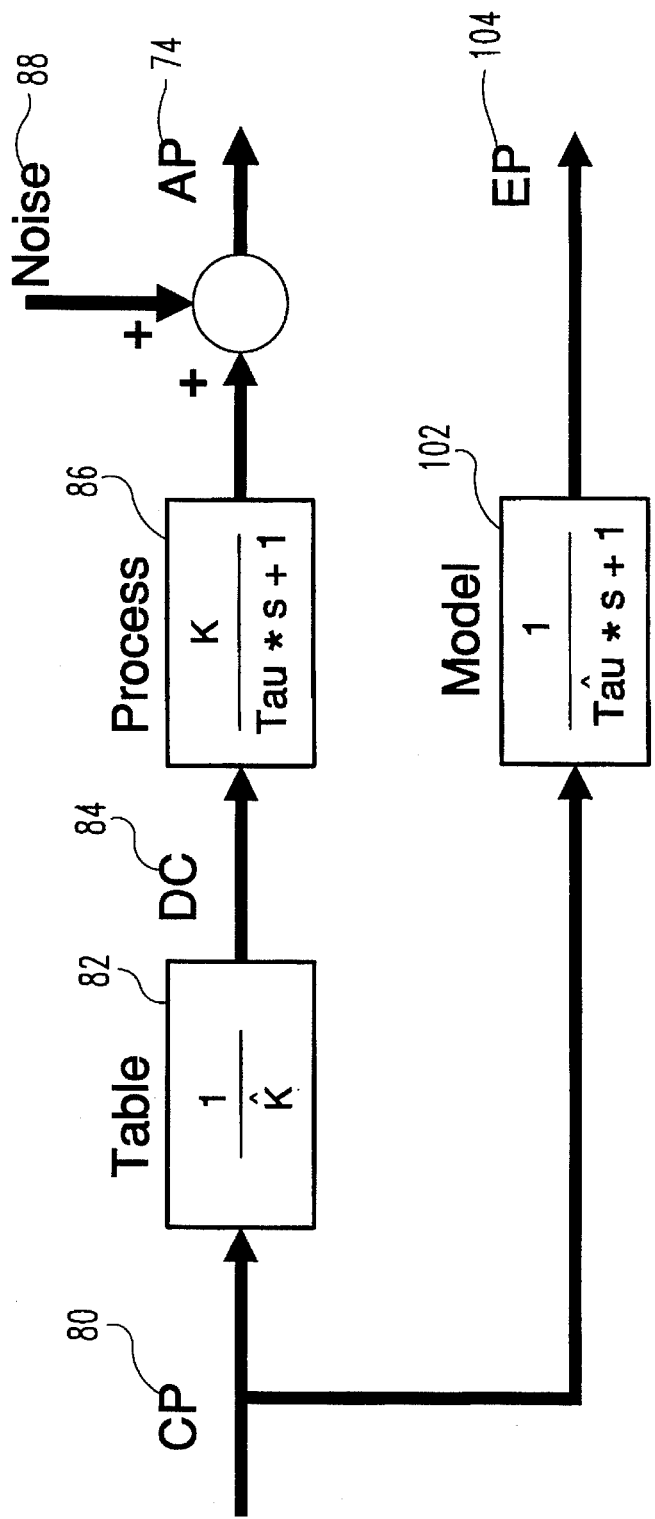
FIG. 7 is a detailed block diagram of a portion of the control system of FIG. 6.

FIG. 7 illustrates an expanded block diagram of a portion of the predictive control system 100 of FIG. 6. Those skilled in the art will appreciate that the fuel system actuator response is estimated by a first order model that contains just one parameter, the time constant Tau of the actuator. Both the system transfer function 86 and the predictive model 102 exhibit first order linear system dynamics, where Tau has a constant value in the time domain. K represents the gain of the solenoid valves 24 and 30. FIG. 8 illustrates the filter structure of the prior art filter 90, while FIG. 9 illustrates the filter structure of the filter 110 used in the predictive control system 100. The filtering amount is based on the frequency components of the pressure signals. Because the pressure measurements are synchronized with engine speed, the filter is a variable frequency filter and it is a function of engine speed. With the filter 110, the noise component of the measured signal is minimized for all operating conditions.

Figure 10:
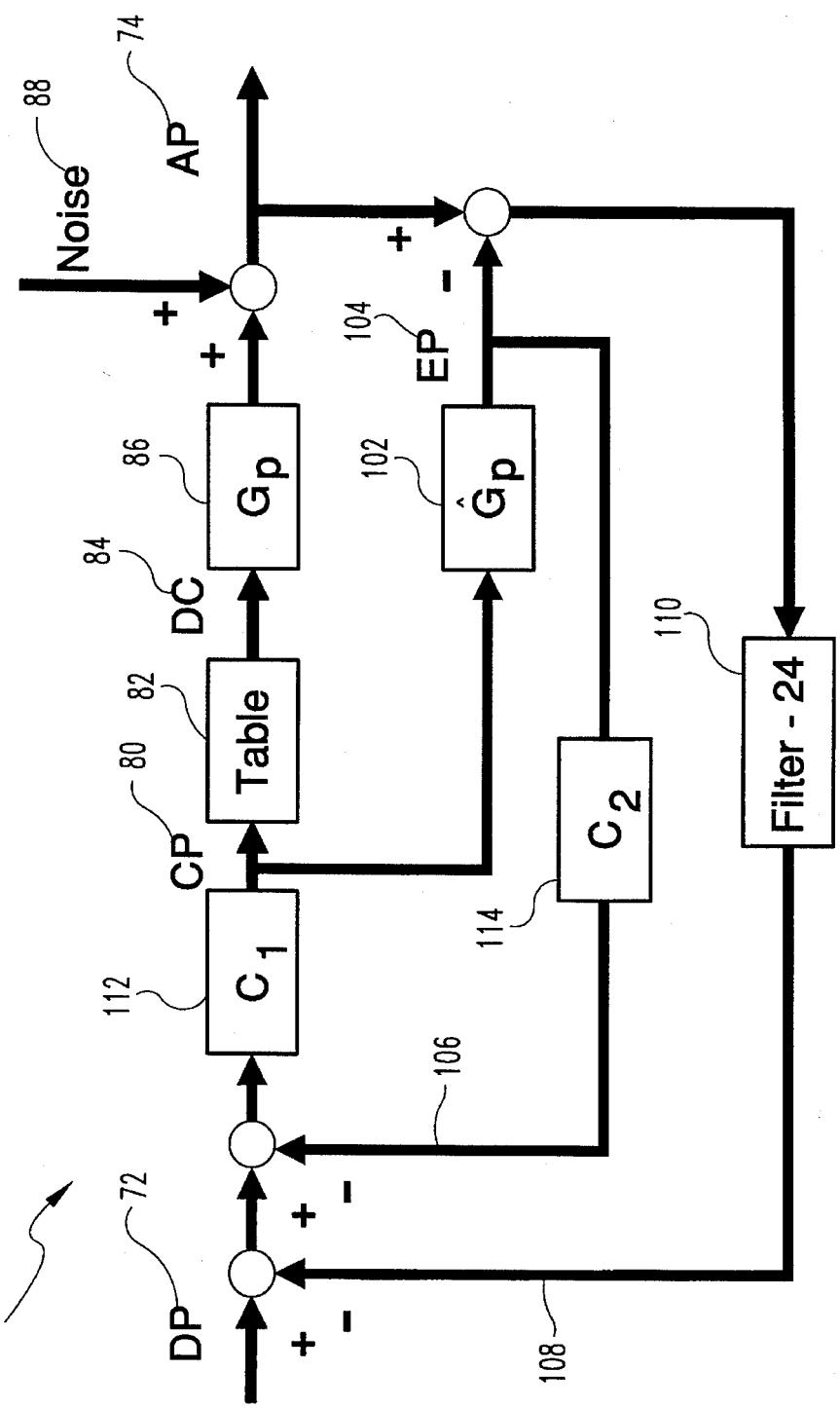
FIG. 10 is a block diagram of a second embodiment control system of the present invention.

The use of the predictive control concept of the present invention is not limited to controllers employing a PID control algorithm in the feedforward path. For example, FIG. 10 illustrates a block diagram of a predictive control system 120 using a PI controller in the feedforward path as well as a compensator in the feedback path. This method employs predictive control with a pole-zero assignment algorithm. This control system performs exactly the same as the predictive control with PID format illustrated in FIG. 6, but has the very significant advantage of increased ease of tuning of the controller parameters. This is because on-line (automatic) tuning of the pressure loops are possible with the pole-zero assignment algorithm. The PID function is divided between a forward controller 112 and a feedback controller 114, giving two degrees of freedom compared to the single degree of freedom of the controller 78 of FIG. 6. The user can specify the desired closed-loop settling time and the estimated open-loop settling time, and all controller parameters can be calculated automatically in software. The trial and error methods used in tuning prior art controllers, therefore, can be avoided.

Figure 11:
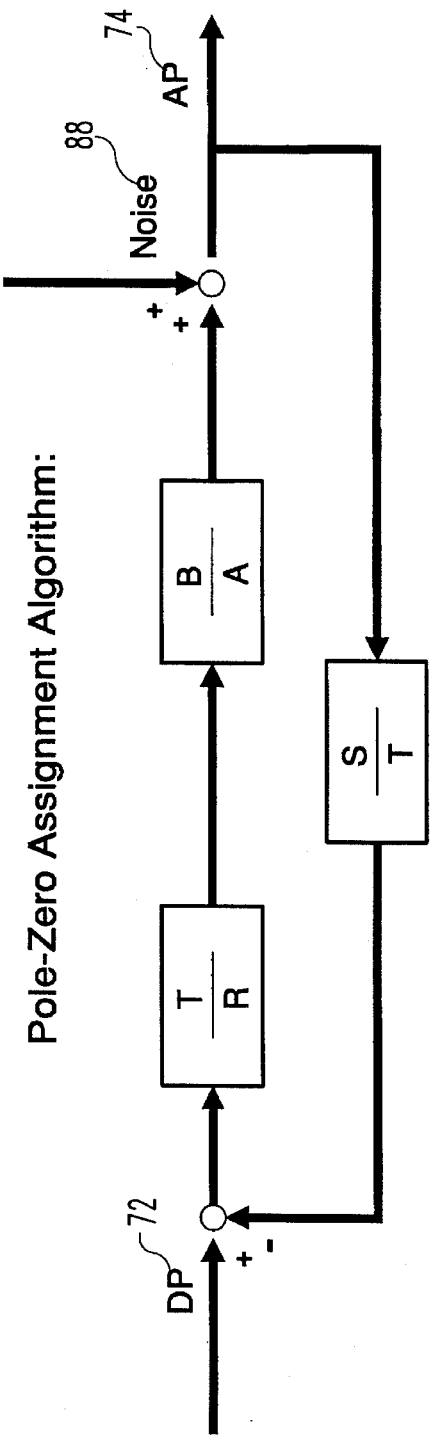
FIG. 11 is a block diagram illustrating a pole-zero assignment algorithm of the present invention.

The pole-zero assignment algorithm of the controller 120 is illustrated in FIG. 11. If the process transfer function is designated as B/A, then it is necessary to identify the controller polynomials T, R and S such that the closed-loop will have the desired transfer function $B_m/A_m$. If the desired closed-loop transfer function is $B_m/A_m$, then a unique combination of T, R, and S polynomials exist and can be easily determined for a given process transfer function B/A as indicated in FIG. 11. Use of the pole-zero assignment algorithm has several advantages over the PID structure. In the PID structure, it is not possible to adjust both zero and pole locations arbitrarily while this is possible in the pole-zero assignment algorithm. In practice, therefore, it is much easier to tune the pole-zero assignment algorithm than to tune a PID controller. Also, tile PID structure applies the same response to desired pressures, measurement noise, and other disturbances. In the pole-zero assignment algorithm, it is possible to have different response characteristics to desired pressures, measurement noise, and other disturbances. In other words, sensitivity to disturbances and measurement noise can be adjusted by the user.

FIGS. 12a–d depict the dramatic reduction in injector fuel rail pressure variations achieved by the model predictive control system of the present invention. All data was taken using a Cummins L10 engine running at 600 RPM with 500 ft-lbs torque steady-state conditions. In FIG. 12a, the fuel rail pressure is given without filtering of any kind. The data indicates a maximum 100% error from the desired 4 PSI value. FIG. 12b shows the same data after installation of a 45 Hz hardware filter. Some improvement is obtained, however the fuel rail pressure still exhibits a high degree of variation. FIG. 12c illustrates tile fuel rail pressure with the addition of the prior art closed-loop control system 70 of FIG. 2. Further improvement is exhibited, however pressure swings of up to 2 psi still exist. FIG. 12d shows the fuel rail pressure when the model predictive control closed-loop structure 100 of FIG. 6, using the 24-pole averaging filter 110, is used. It is readily apparent that the fuel rail pressure has been stabilized and exhibits no appreciable variation.

Figure 13:
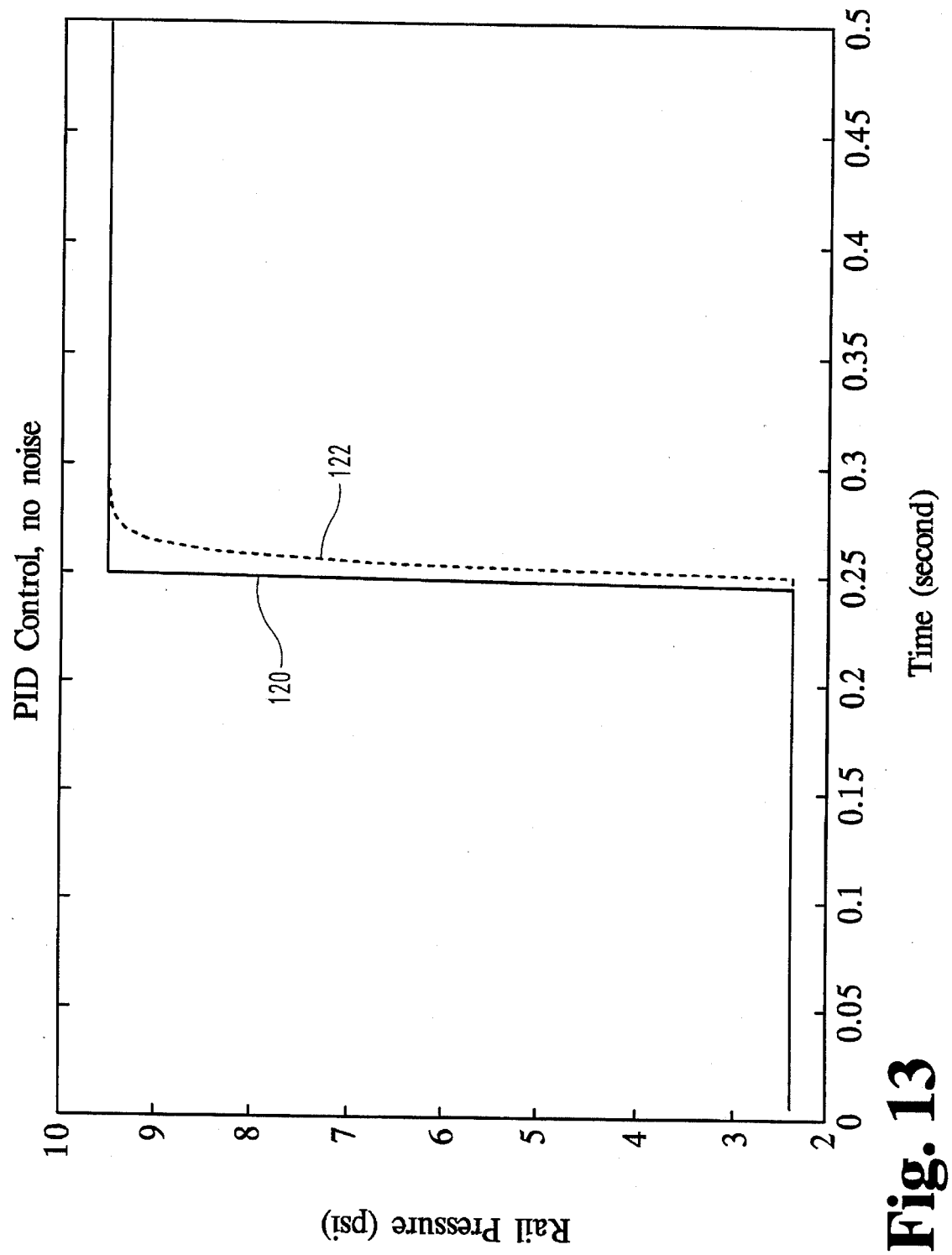
FIG. 13 is a graph of simulated rail pressure versus time in response to an input step function, for a prior art control system utilizing PID control with no measurement noise.
Figure 14:
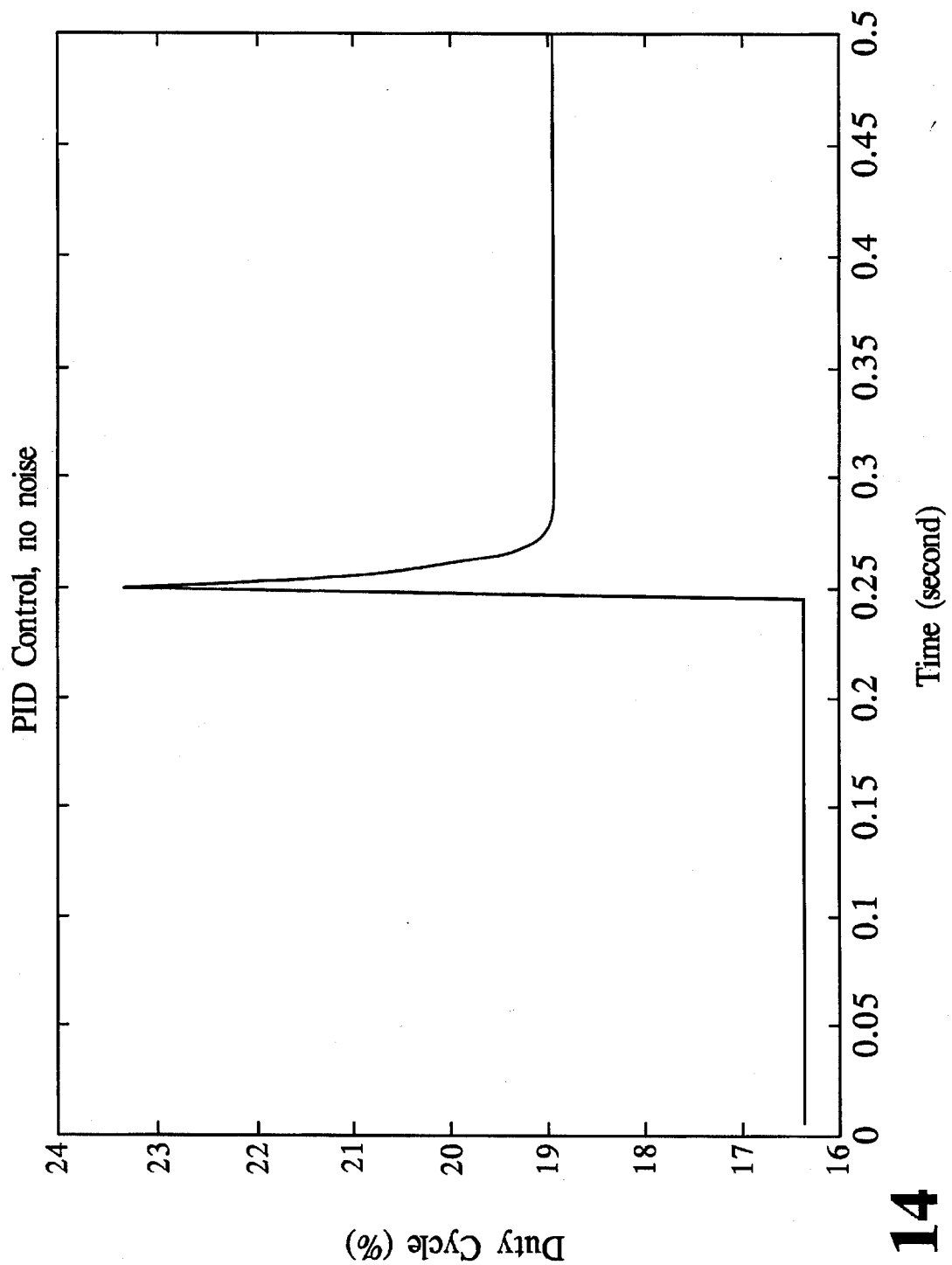
FIG. 14 is a graph of duty cycle versus time for the control system used in FIG. 13.
Figure 15:
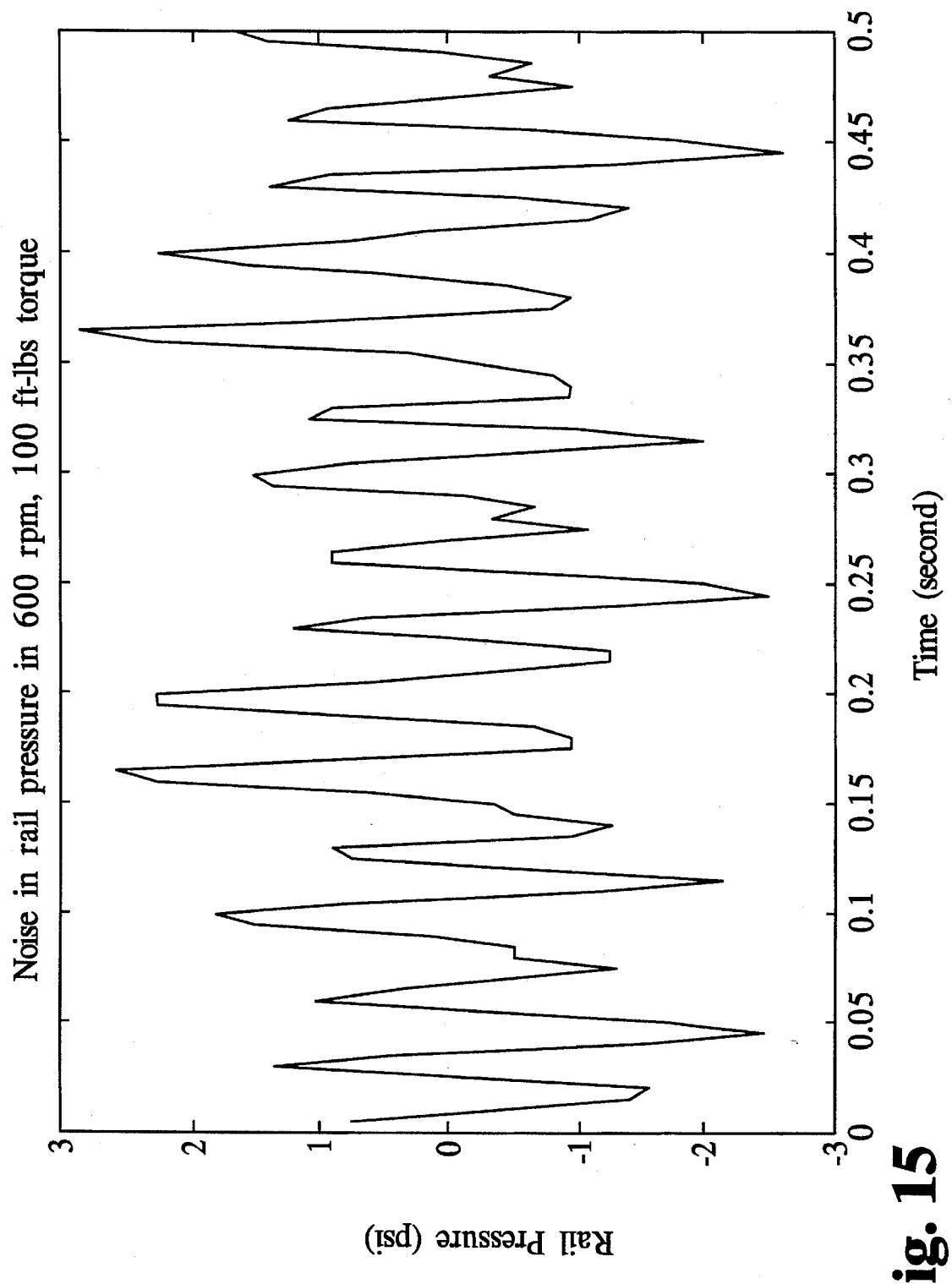
FIG. 15 is a graph of rail pressure noise versus time used in the simulations of FIGS. 16–19.
Figure 16:
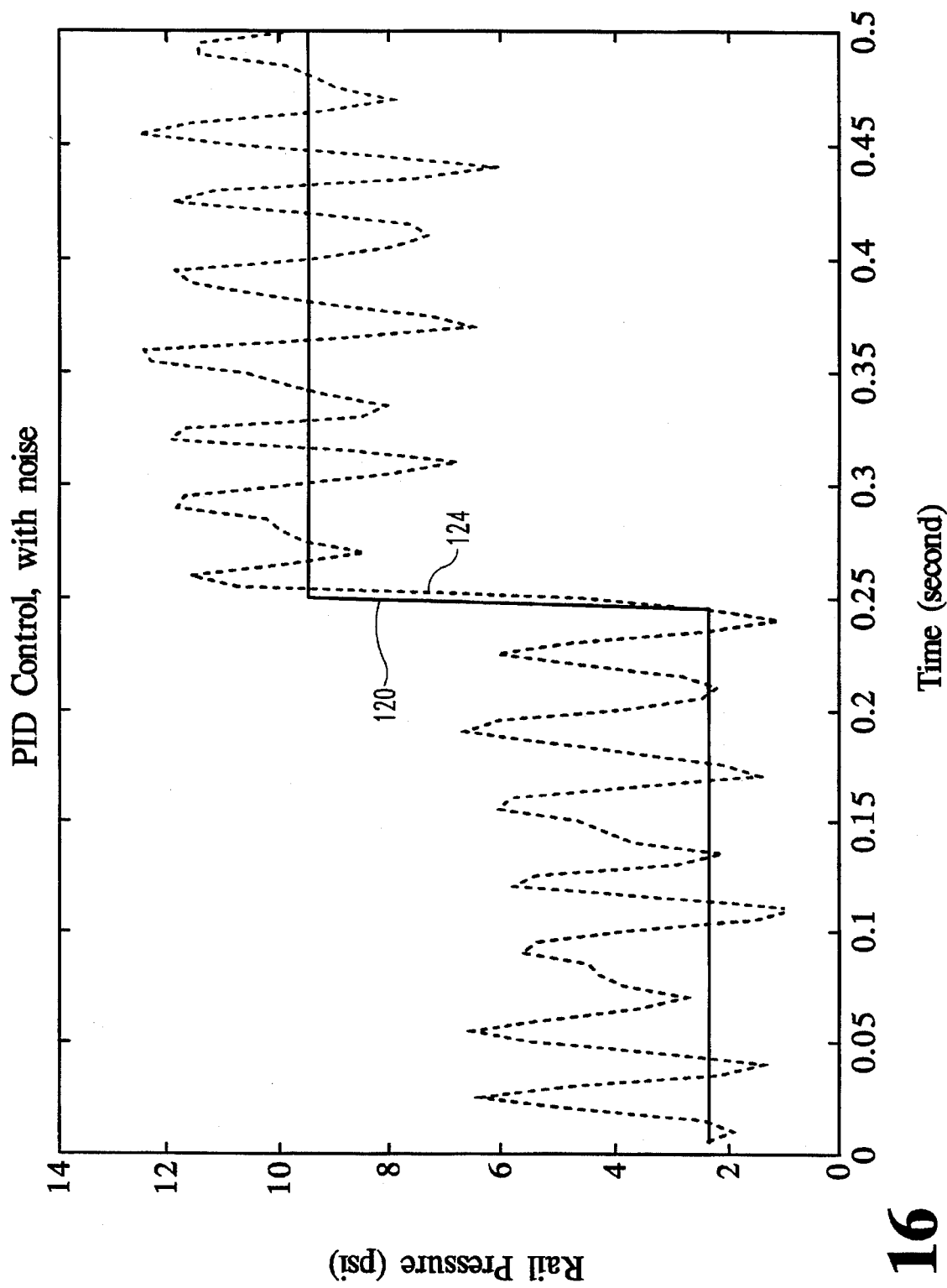
FIG. 16 is a graph of rail pressure versus time for an engine controlled by a prior art PID closed-loop control system.
Figure 17:
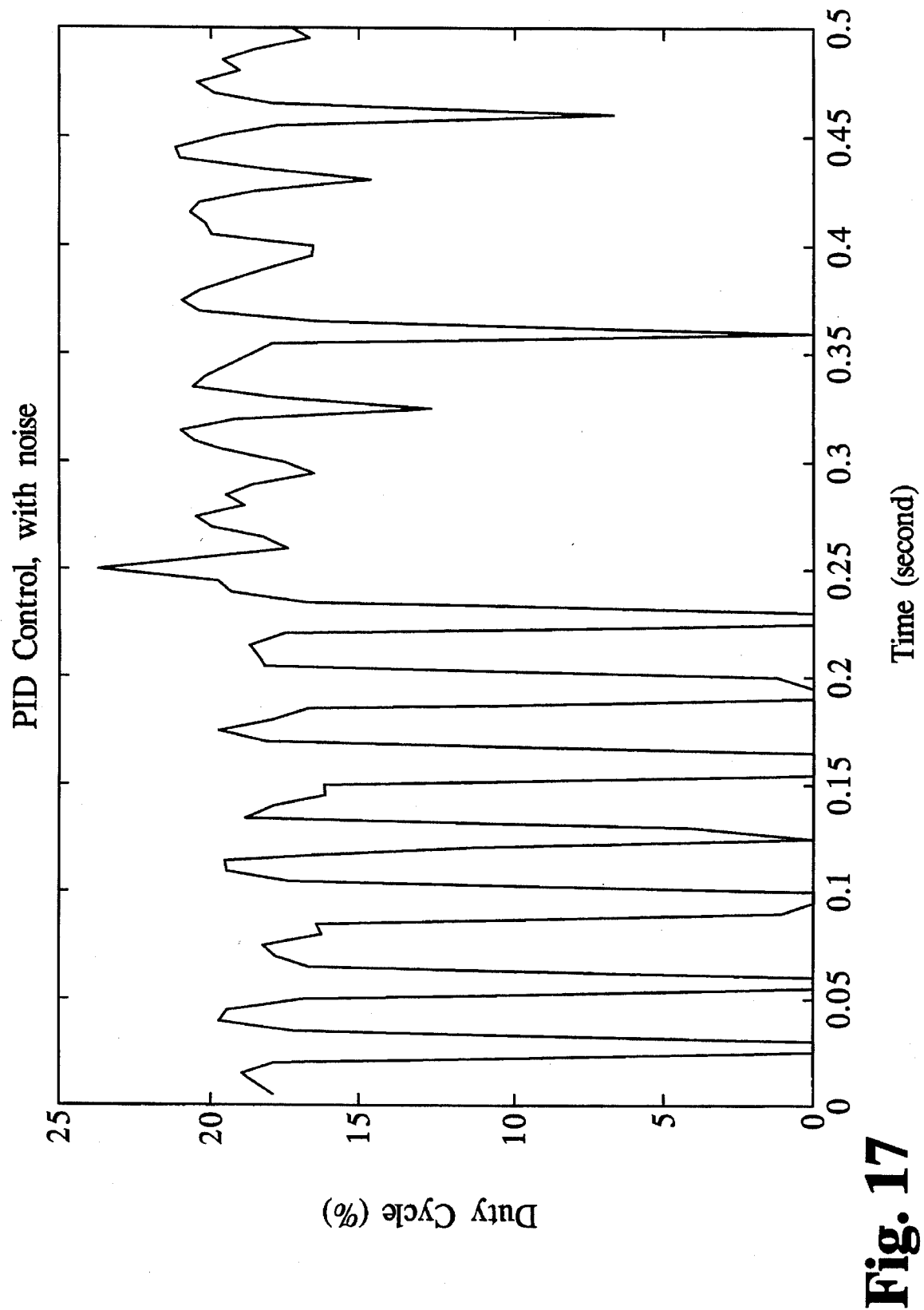
FIG. 17 is a graph of duty cycle versus time for an engine controlled by a prior art PID closed-loop control system.

Computer simulations of engine performance using both the prior art controller 70 of FIG. 2 and the model predictive control closed-loop controller of the present invention illustrate the significant advantages achieved through use of predictive control. In all of the following simulations, the valve actuator is modeled as a first order system having a time constant (Tau) of 33 milliseconds. FIG. 13 illustrates the step response of a fuel rail pressure loop using the prior art PID controller 70 when there is no noise in the fuel pressure measurements. The line 120 represents tile desired pressure, while the line 122 represents tile actual pressure. FIG. 14 represents the duty cycle output of the same control structure. As seen from these Figures, no problem exists in reaching a 30 millisecond settling time with the PID structure 70 in deterministic conditions. Furthermore, the commanded duty cycle is stable. FIG. 15 is a graph of actual noise in the fuel rail pressure measurements taken from an engine running at 600 RPM and 100 ft-lbs torque. This noise was used in the simulation program to produce all of the following data having noise in the pressure measurements. In FIG. 16, the desired fuel rail pressure step 120 is plotted with the simulated actual fuel rail pressure using the PID controller 70 when the noise of FIG. 15 is present in the pressure measurements. It can be seen that while the 30 millisecond settling time is achieved, there is significant variation in the actual fuel rail pressures. FIG. 17 is a graph of the commanded duty cycle of the solenoid fuel valves for the same system. It will be appreciated by those skilled in the art that the commanded duty cycle variation is extremely large and is the reason for unstable engine operation in actual tests using this controller tuned to a 30 millisecond response time. The PID gains for these simulations are KPI=3.75 and KI=0.6.

Figure 18:
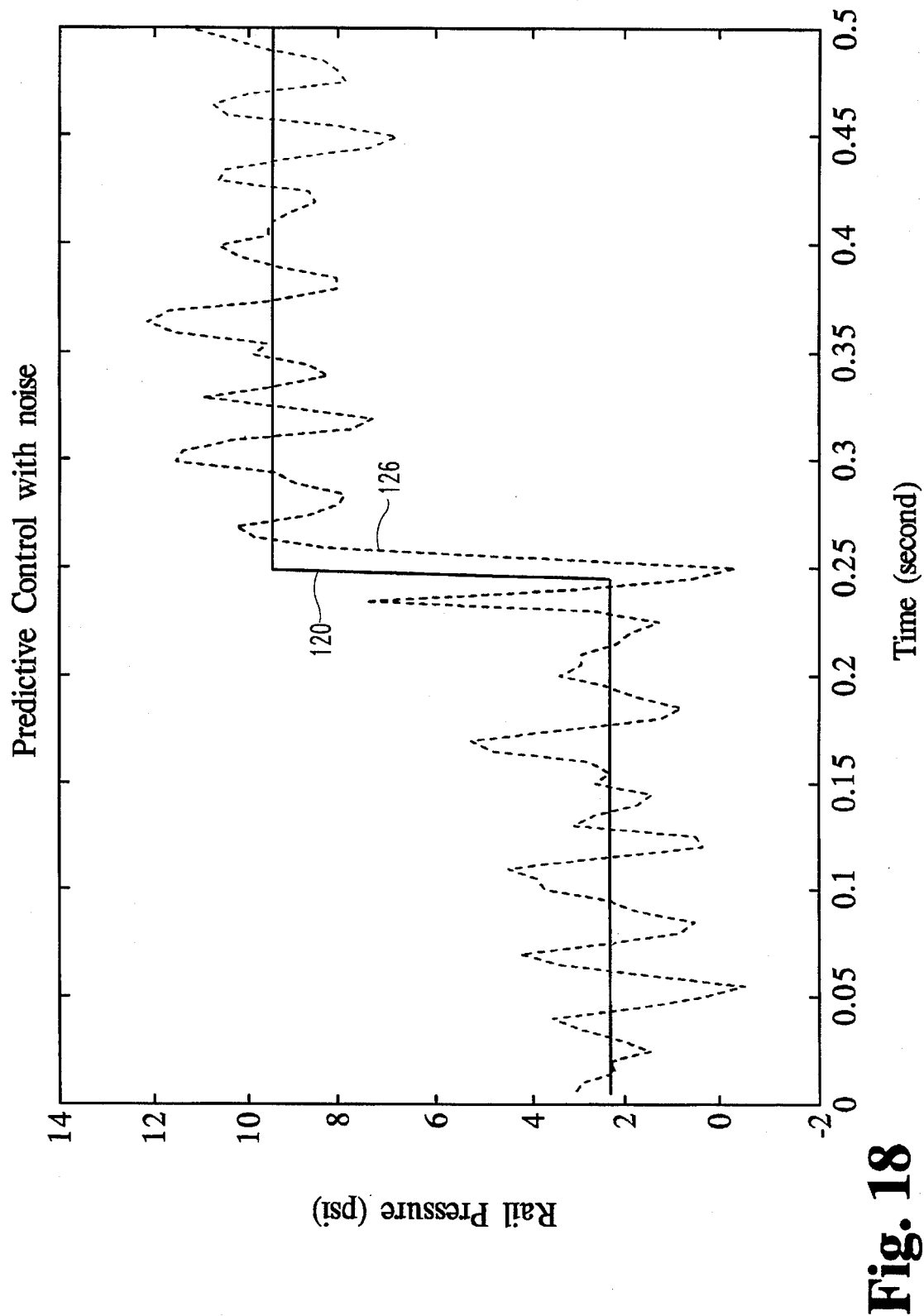
FIG. 18 is a graph of rail pressure versus time for a closed-loop control system of the present invention.
Figure 19:
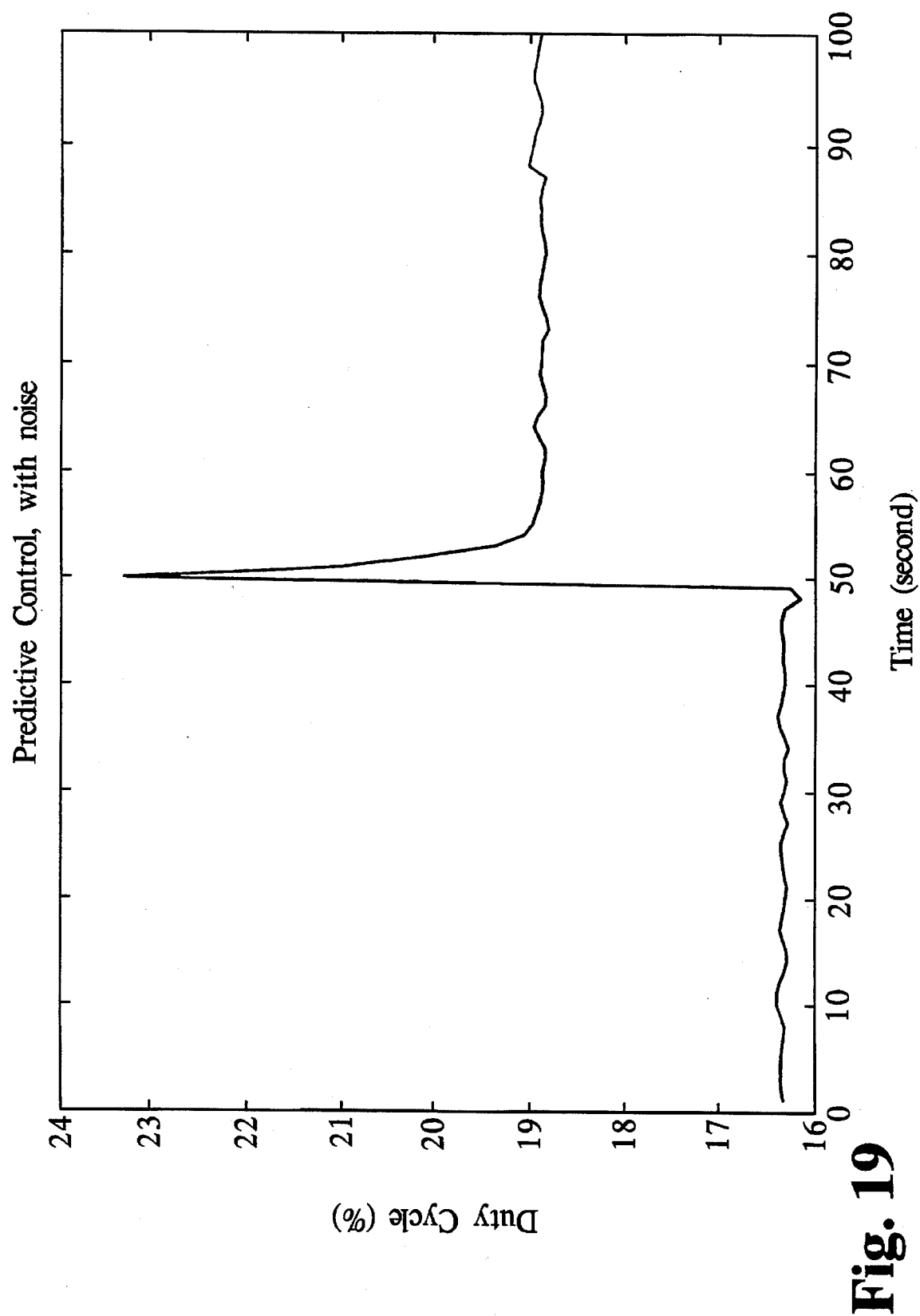
FIG. 19 is a graph of duty cycle versus time for a closed-loop control system of the present invention.

In the case of model predictive control using the PID structure, such as controller 100 of FIG. 6, and a no noise condition, the predictive control structure will perform exactly the same as the prior art PID structure without noise. When noise is added into the fuel pressure measurements, however, the actual fuel rail pressure 126 of FIG. 18 and the duty cycle of FIG. 19 result. A comparison of the stable commanded duty cycle of FIG. 19, using the model predictive control system of FIG. 6, with the highly unstable commanded duty cycle of FIG. 17, using the prior art PID control system, gives an indication of the significant improvements possible with the model predictive control system of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of providing feedback in a closed-loop control system which controls a first system, comprising the steps of:

(a) predicting an expected output of the first system using a model of the first system;

(b) feeding back the expected output as a first feedback input to the control system;

(c) computing an error between an actual output of the first system and the expected output;

(d) filtering the error in order to attenuate unwanted frequency components;

(e) creating a second feedback input based on the filtered error;

(f) feeding back the second feedback input to the control system, wherein there is a delay between feedback of the first and second feedback inputs;

(g) producing a control system output based upon the first and second feedback inputs; and (h) applying the control system output to the first system in order to control the first system.

2. The method claim 1 wherein step (d) comprises filtering the error.

3. The method of claim 1 wherein the error includes noise associated with measuring the actual output of the first system.

4. The method of claim 1 wherein tile first system is a fuel supply system for an internal combustion engine.

5. A method of providing fast response from a first system controlled by a closed-loop control system, comprising the steps of:
- (a) inputting a desired first system output signal to the control system;
- (b) generating a first system input signal from the control system based on the desired first system output signal;
- (c) generating an expected first system output signal based on the first system input signal;
- (d) feeding back the expected first system output signal as a first feedback input to the control system;
- (e) applying the first system input signal to the first system;
- (f) generating an actual first system output signal from the first system;
- (g) generating an error input signal equal to a difference between the actual first system output signal and the expected first system output signal;
- (h) generating an error output signal based on the error input signal; and
- (i) feeding back the error output signal as a second feedback input to the control system, wherein there is a delay between feedback of the first and second feedback inputs;
- (j) producing a control system output based upon the first and second feedback inputs; and
- (k) applying the control system output to the first system in order to control the first system.

6. The method of claim 5 wherein the first system is a fuel supply system for an internal combustion engine.

7. The method of claim 6 wherein the desired first system output signal is a desired pressure.

8. The method of claim 6 wherein the first system input signal is a commanded duty cycle.

9. The method of claim 6 wherein the first system output signal is a fuel rail pressure.

10. The method of claim 5 wherein step (h) comprises filtering the error input.

11. The method of claim 5 wherein the error input signal includes noise associated with measuring the actual first system output.

12. A fuel pressure system employing model predictive closed-loop control, comprising:
- a reservoir adapted to hold a quantity of fuel;
- a fuel pump operable to supply the fuel to a fuel injection system at a rate;
- a pressure control device operatively coupled to the fuel injection system and operable to establish a fuel pressure in the fuel injection system, wherein the fuel is delivered to at least one fuel injector at the fuel pressure;
- a pressure transducer operatively coupled to the fuel injection system and operable to produce a measured fuel pressure signal proportional to the fuel pressure; and
- a control system operable to receive an input from the pressure transducer and provide a pressure control output to the pressure control device, wherein the control system generates the pressure control output using a model predictive first feedback signal and a second feedback signal based on the measured fuel pressure signal.

13. The fuel pressure system of claim 12, wherein the pressure control device comprises a valve in the fuel line operable to allow a selected quantity of tile fuel to flow past the valve and drain back to the reservoir, wherein selection of the selected quantity determines the fuel pressure.

14. The fuel pressure system of claim 12, wherein the control system comprises an electronic control unit laving at least a throttle position input and an engine speed input, the electronic control unit comprising:
- means for producing a desired fuel pressure signal based on at least the throttle position input and the engine speed input;
- means for producing a commanded, fuel pressure signal based on the desired fuel pressure signal, the first feedback signal and the second feedback signal;
- means for predicting an expected measured fuel pressure signal by applying the commanded fuel pressure signal to a model of the fuel pressure system;
- means for feeding back the expected measured fuel pressure signal as the first feedback signal;
- means for producing an error correction signal based on a difference between the measured fuel pressure signal and the expected measured fuel pressure signal; and
- means for feeding back the error correction signal as the second feedback signal.

15. The fuel pressure system of claim 14, wherein there is a delay between feeding back the first feedback signal and the second feedback signal.

16. The fuel pressure system of claim 14, wherein the error correction signal is produced by filtering the difference between the measured fuel pressure signal and the expected measured fuel pressure signal.

17. A closed-loop control system employing model predictive control to control a first system, comprising:
- means for predicting an expected output of the first system using a model of the first system;
- means for feeding back the expected output as a first feedback input to the control system;
- means for computing an error between an actual output of the first system and the expected output;
- means for filtering the error in order to attenuate unwanted frequency components;
- means for creating a second feedback input based on the filtered error;
- means for feeding back the second feedback input to the control system, whereby there is a delay between feedback of the first and second feedback inputs;
- means for producing a control system output based upon the first and second feedback inputs; and
- means for applying the control system output to the first system in order to control the first system.

18. The closed-loop control system of claim 17, wherein the means for creating a second feedback input comprises a filter.

19. The closed-loop control system of claim 17, wherein the error includes noise associated with measuring the actual output of the first system.

20. The closed-loop control system of claim 17, wherein the first system is a fuel supply system for an internal combustion engine.

21. A method of providing feedback in a closed-loop control system which controls a first system, comprising the steps of:
- (a) calculating a first portion of a control algorithm in a feedforward path;

(b) predicting an expected output of the first system using a model of the first system;

(c) using the expected output to calculate a second portion of the control algorithm, thereby creating a first feedback input;

(d) feeding back the first feedback input to the first portion;

(e) computing an error between an actual output of the first system and the expected output;

(f) filtering the error in order to attenuate unwanted frequency components;

(g) creating a second feedback input based on the filtered error;

(h) feeding back the second feedback input to the first portion, wherein both pole and zero locations of the control algorithm may be assigned arbitrarily;

(i) producing a control system output based upon both the first and second feedback inputs; and (j) applying the control system output to the first system in order to control the first system.

22. The method of claim 21 wherein step (a) comprises calculating a PI algorithm.

23. The method of claim 21 wherein step (c) comprises using a compensator for the second portion of the control.

* * * * *

UNITED STATES PATENT AND TRADEMARK OFFICE
CERTIFICATE OF CORRECTION

PATENT NO. : 5,609,136
DATED : March 11, 1997
INVENTOR(S) : Taner Tuken

It is certified that error appears in the above-identified patent and that said Letters Patent is hereby corrected as shown below:

In column 1, line 48, please change "khan" to --than--.

In column 3, line 2, please delete the hyphen.

In column 5, lines 15, 18 and 35, please change "tile" to --the--.

In column 7, lines 28, 46, 63 and 64, please change "tile" to --the--.

In column 9, line 1, please change "tile" to --the--.

In column 10, line 3, please change "tile" to --the--.

In column 10, line 7, please change "laving" to --having--.

In column 10, line 13, please delete the comma.

In column 12, line 12, please insert --algorithm-- before the period.

Signed and Sealed this

Twenty-eighth Day of October, 1997

Attest:

BRUCE LEHMAN

Attesting Officer     Commissioner of Patents and Trademarks